No. 673,952. Patented May 14, 1901.
L. W. HILDBURGH.
ASSYMMETRICAL ELECTRICAL CONDUCTOR.
(Application filed Nov. 22, 1897.)
(No Model.)
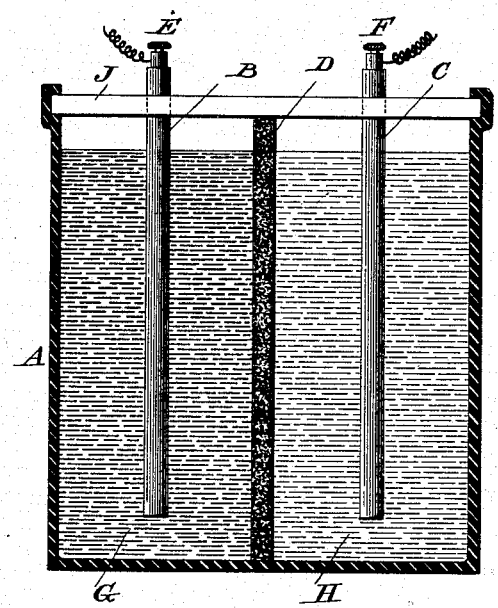

UNITED STATES PATENT OFFICE.

LEO WALTER HILDBURGH, OF NEW YORK, N. Y.

ASYMMETRICAL ELECTRICAL CONDUCTOR.

SPECIFICATION forming part of Letters Patent No. 673,952, dated May 14, 1901.

Application filed November 22, 1897. Serial No. 659,376. (No model.)

*To all whom it may concern:*

Be it known that I, LEO WALTER HILDBURGH, a citizen of the United States, residing at New York city, in the county and State of New York, have invented a certain new and useful Improvement in Asymmetrical Electrical Conductors, of which the following is a specification.

The object of this invention is the production of a conductor such that its ohmic or equivalent resistance is greater when the current passes in one direction than when it passes in the opposite direction.

The invention consists in its simplest form of two electrolytes in electrolytic communication, into each of which dips an inoxidizable electrode. If, for instance, the electrolytes consist of aqueous solutions, at least one of them will be more affected by the contact of hydrogen than by the contact of oxygen.

The accompanying drawing shows a typical form of the apparatus.

A is a containing vessel, of insulating material; B and C, conducting electrodes, of preferably similar composition, and whose respective terminals are E and F. The electrodes should be composed of a metal or other material or composition which is not readily attacked by the liquid in which it is immersed. The electrodes are supported by any suitable insulating device, a bar J, of insulating material, being shown.

D is a porous partition separating the electrolytes G and H, G being an oxidizing liquid, such as nitric acid, and H a neutral one, which in this instance may be dilute sulfuric acid. By "neutral" I mean a liquid which has no chemical action on either the electrode immersed in it or on the other liquid in the cell. This device is not designed to generate a current of electricity to oppose a current passed into the cell in one direction. A very weak current may be generated; but this is so slight as to be negligible and is of no practical effect in opposing the flow of a current passed into the cell. When a current is passed through this cell which deposits oxygen in contact with the nitric acid and hydrogen in contact with the sulfuric acid, the apparent resistance of the cell increases greatly, decreasing the current in the circuit to a corresponding extent; but upon reversing the direction of the electromotive force it will be found that the current again passes freely, the apparent resistance of the cell having decreased. Upon again reversing the direction the current is again reduced. Another reversal brings it back to its former strength. This action may be continued indefinitely or until the material of the cell requires renewal. The action is due, it is believed, to two causes. The first of these is the increase in the ohmic resistance of the cell by the deposition of layers of gas on the surface of the electrodes. The second is due to a difference in the counter electromotive force of the cell, according to the direction of the current passing through it. It is quite evident that the relative importance of these actions may be varied by varying the actual or comparative sizes of the electrodes, as on the size of the electrodes will depend the thickness of the gas film and the time required to remove it. It is clear that in general the greater the difference in the oxidizing power of the two electrolytes the greater will be the action.

Almost any two liquids upon which oxygen and hydrogen produce different effects may be utilized for the electrolytes. With dilute sulfuric acid as one liquid nitric acid of various strengths, chromic acid, binoxid of hydrogen, or one of many others may be used for the second liquid. Almost any pair of these electrolytes may be used for the two liquids, or certain electrolytes, such as nitric acid, in different strengths may be used with a dilute solution, replacing the sulfuric acid. It is also evident that if gases other than oxygen and hydrogen are primarily generated there may be employed other electrolytes suitable for the removal or absorption of the gases produced. The oxidizing liquid should preferably be irreversible—that is, it should part with its oxygen freely, but the residuum should be reoxidized with difficulty, if at all. As the oxidizing-electrolyte I have found concentrated nitric acid to give the best results.

The cell shown is merely typical in construction, for it is obvious to all acquainted with the construction of electrical batteries that innumerable modifications may be introduced. As one example of such a modification it may be stated that the containing vessel might be composed of or lined with a suitable conducting material in order that it may be used as one of the electrodes. Furthermore, the composition of one of the electrodes might be altered to make it more suitable to the liquid in which it is immersed while keeping its function the same—for instance, one of the electrodes may be made of a substance a solution of whose salt forms the oxidizing-electrolyte. The electrolytes might also be mechanically agitated or the electrodes vibrated, so that fresh surfaces of electrolyte will be continually presented to the surfaces of the electrodes. Another modification is the employment of two liquids such that gravity will tend to keep them separated, or using a third liquid to keep the two main electrolytes separated. Therefore I do not limit myself to any special shape or size of the electrodes or the containing vessel or vessels, nor to the material of which they are made, nor to the specific combination of any of the liquids herein mentioned, nor to the manner in which the asymmetrical electrical conductor is employed.

What I claim is—

1. The combination of two electrolytes with two electrodes producing only a negligible current and permitting the flow of current more freely in one direction than in the opposite direction.

2. The combination of two fluids with two electrodes producing only a negligible current and permitting the flow of current more freely in one direction than in the opposite direction.

3. The combination of a neutral electrolyte and an oxidizing-electrolyte with two electrodes for the purpose of permitting the flow of current more freely in one direction than in the opposite direction.

4. The combination of a neutral electrolyte and an oxidizing-electrolyte with two electrodes producing only a negligible current and permitting the flow of current more freely in one direction than in the opposite direction.

5. The combination of a neutral electrolyte and an oxidizing-electrolyte containing respectively inert and oxidizable electrodes producing only a negligible current and permitting the flow of current more freely in one direction than in the opposite direction.

6. The combination of two electrolytes, one being concentrated nitric acid, and two conducting-electrodes producing only a negligible current and permitting the flow of current more freely in one direction than in the opposite direction.

7. An irreversible combination consisting of two electrolytes and two electrodes producing only a negligible current and permitting the flow of current more freely in one direction than in the opposite direction.

8. The combination of two electrolytes with two electrodes producing only a negligible current, and permitting the flow of current more freely in one direction than in the opposite direction, one of said electrolytes being irreversible.

9. The combination of a neutral electrolyte and an oxidizing-electrolyte, with two electrodes for the purpose of permitting the flow of current more freely in one direction than in the opposite direction, said oxidizing-electrolyte being irreversible.

10. A device consisting of two electrolytes and two electrodes producing only a negligible current and having a counter electromotive force whose size is dependent upon the direction of a current flowing through it.

11. A device consisting of two electrolytes and two electrodes producing only a negligible current and in which the substances carried to either or both electrodes by a current flowing through it in one direction are immediately removed, while the substances carried to either or both electrodes by a current flowing through it in the opposite direction are allowed to remain.

This specification signed and witnessed this 13th day of November, 1897.

LEO WALTER HILDBURGH.

Witnesses:
  W. PELZER,
  EUGENE CONRAN.